United States Patent [19]

Dominici

[11] Patent Number: 5,777,299
[45] Date of Patent: Jul. 7, 1998

[54] INDUCTION GENERATOR TO HEAT METALLIC PIPES WITH A CONTINUOUS PROCESS UNDER A CONTROLLED ATMOSPHERE

[75] Inventor: Erasmo Dominici, Pianezza, Italy

[73] Assignee: Emmedi, S.p.A., Turin, Italy

[21] Appl. No.: 755,779

[22] Filed: Nov. 22, 1996

[30] Foreign Application Priority Data

Dec. 22, 1995 [IT] Italy .................... TO95A1035

[51] Int. Cl.⁶ .................................. H05B 6/08
[52] U.S. Cl. ................... 219/607; 219/608; 219/611; 219/615; 219/651; 219/662; 219/656
[58] Field of Search ................... 219/607, 608, 219/611, 615, 617, 635, 643, 651, 656, 661, 662, 666, 674

[56] References Cited

U.S. PATENT DOCUMENTS

| 3,521,018 | 7/1970 | Boerger et al. | 219/651 |
|---|---|---|---|
| 3,531,612 | 9/1970 | Viart | 219/662 |
| 4,721,836 | 1/1988 | Zeisse et al. | 219/651 |
| 4,755,648 | 7/1988 | Sawa | 219/662 |
| 4,788,394 | 11/1988 | Vaneste et al. | 219/656 |
| 5,571,437 | 11/1996 | Rudd | 219/607 |

FOREIGN PATENT DOCUMENTS

| 60-124482 | 3/1985 | Japan . |
|---|---|---|
| 5261526 | 12/1993 | Japan . |
| 2253214 | 9/1992 | United Kingdom . |

*Primary Examiner*—Philip H. Leung
*Attorney, Agent, or Firm*—Paul & Paul

[57] ABSTRACT

An induction heating generator is described for braze-welding metallic pipes with a continuous process under a controlled atmosphere, comprising at least one heating inductor composed of two half-inductors in series whose winding directions for their windings are one opposite to the other. The generator is further equipped with a quartz tube placed inside the inductors and in which the metallic pipes pass together with the controlled atmosphere gas. The generator further includes at least one removable sealing insert to join two contiguous inductors. For every medium- and/or high-frequency section of the generator, a load matching system is finally provided to compensate for external diameter variations of the pipes, the system being interlacedly handled by a programmable controller (P.L.C.).

13 Claims, 5 Drawing Sheets

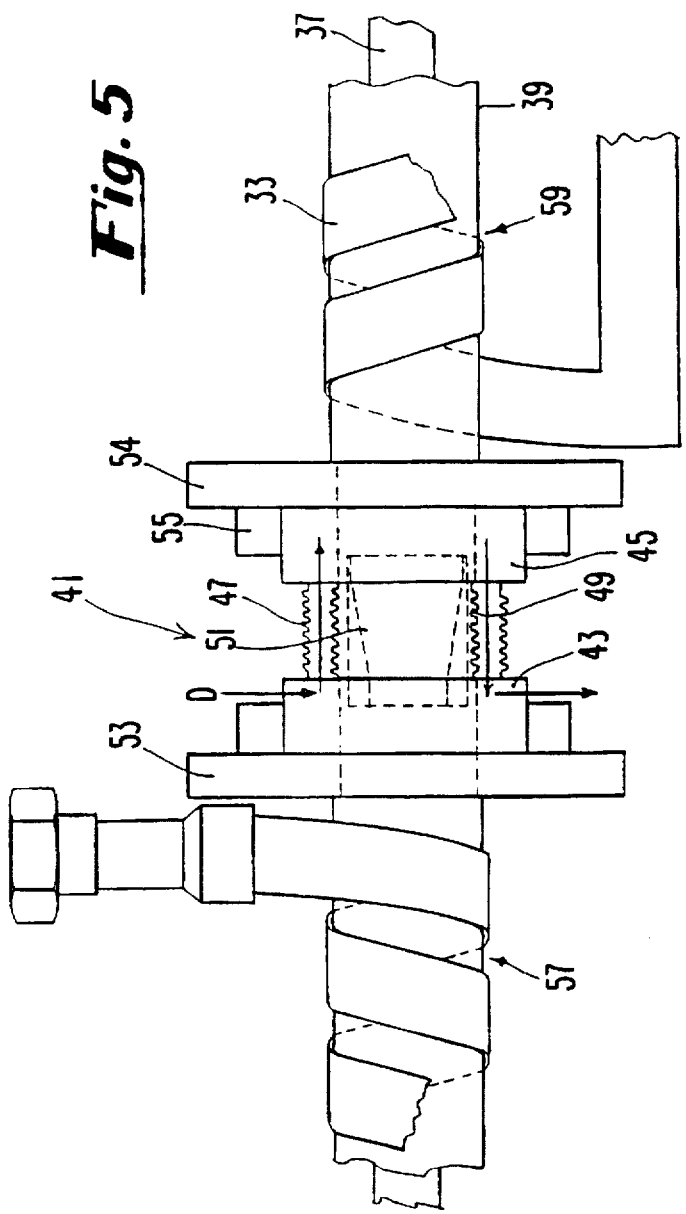
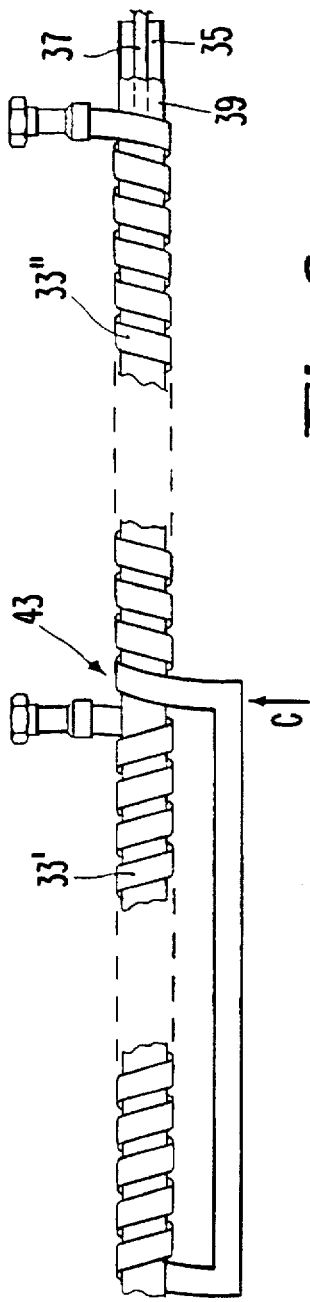

5,777,299

1

INDUCTION GENERATOR TO HEAT METALLIC PIPES WITH A CONTINUOUS PROCESS UNDER A CONTROLLED ATMOSPHERE

BACKGROUND OF THE INVENTION

1. Field of the Invention

The present invention deals with an induction generator to heat metallic pipes with a continuous process under a controlled atmosphere, and particularly with double-walled metallic pipes for motor vehicle braking systems or metallic pipes with a small diameter for refrigerating applications and the like.

2. Background Information

In the current art, plants are known for braze-welding, in ovens with a controlled atmosphere, crop ends of bimetallic pipes or for braze-welding with a continuous process doublewalled pipes by means of resistance heating, and moreover plants for induction braze-welding double-walled pipes with a continous process. These latter ones employ heating inductors immersed into a controlled gas atmosphere, through which inductors the bimetallic pipe to be braze-welded continuously passes. During this passage, however, residual voltages induced on the product are generated, these voltages being dangerous since they can create electric discharges between bimetallic pipe and inductor and/or between bimetallic pipe and driving rollers. Furthermore, there are strong explosion risks as regards the hydrogen-based controlled atmosphere, due to gas ionization for these residual induced voltages.

Moreover, these known plants have maintenance problems, because, when there is the need of cleaning them or of replacing a damaged inductor, it is necessary to disassemble and re-assemble the gas-sealed flanged tubular sections with lengthy and cumbersome operations.

Finally, when the external diameter of the produced pipe changes, it is necessary to replace heating inductors through other problematic operations.

SUMMARY OF THE INVENTION

Object of the present invention is solving, first of all, the problem regarding residual induced voltages on the product, totally removing them.

Another object of the present invention is eliminating the ionization or explosion risk as regards the gas mixture, by preventing the contact between heating inductors and controlled atmosphere gas.

A further object of the present invention is providing an effective arrangement to join containing tunnel sections that makes maintenance operations easier, and an electronic arrangement that does not oblige replacing the inductors at every diameter change for the produced pipe.

The above-mentioned and other objects and advantages of the invention, as will appear from the following description, are obtained by means of an induction heating generator for braze-welding metallic pipes with a continuous process under a controlled atmosphere as claimed in claim 1, with the constructive and improving embodiments claimed in claims 2 to 13.

Further properties and advantages of the invention will better appear from the description of a preferred, but not exclusive, embodiment of the device shown as a non limiting example in the accompanying drawings.

2

Figure 2:
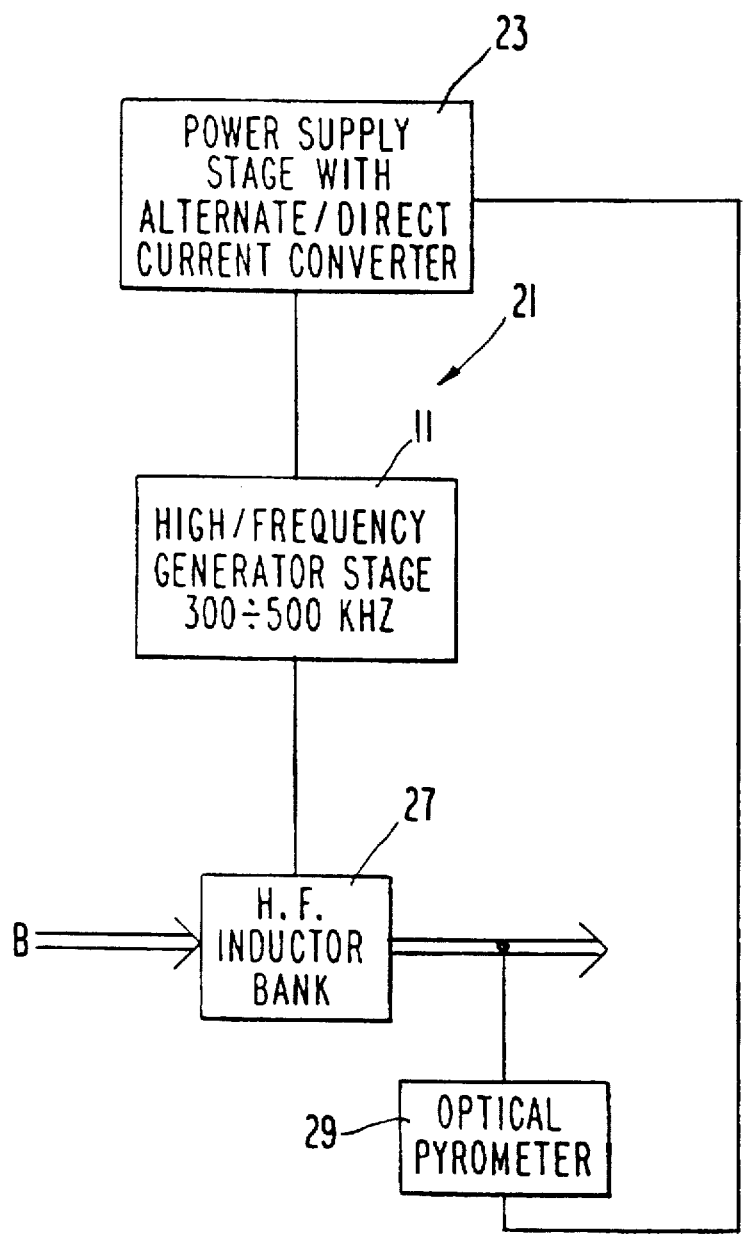
Figure 3:
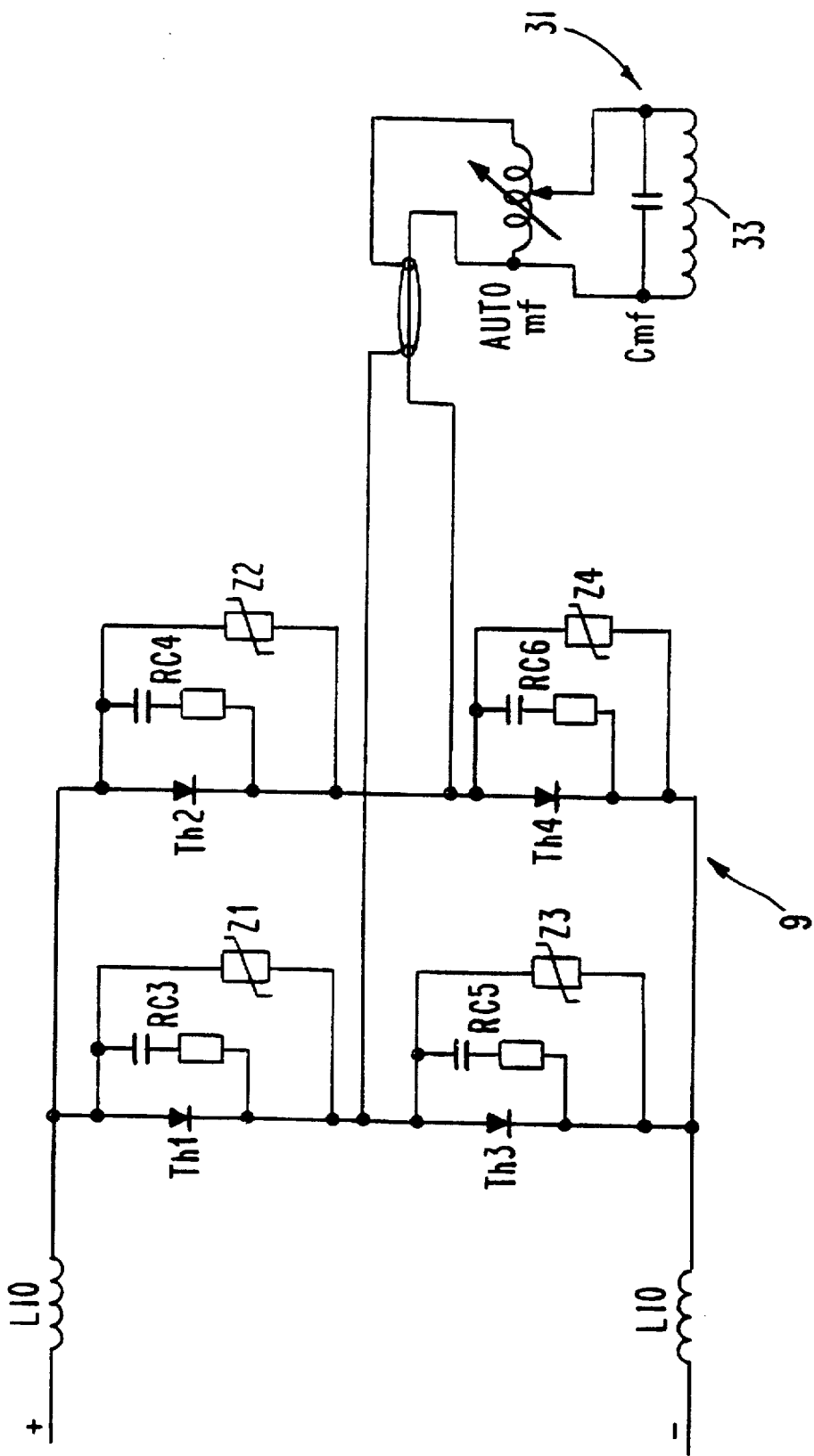
Figure 4:
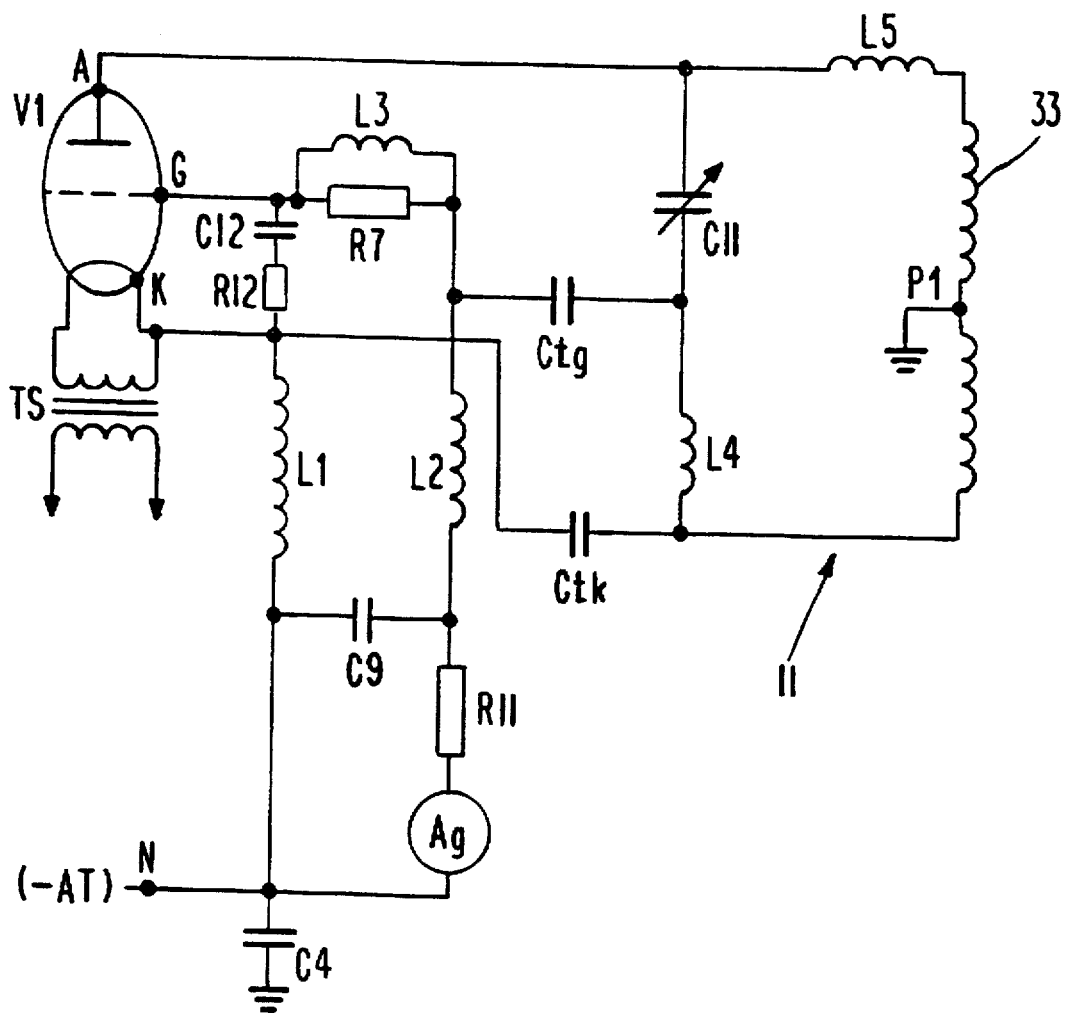

FIG. 2 is a block diagram of a second embodiment of the induction heating generator according to the present invention;

FIG. 3 is a circuit diagram of the medium-frequency section of an embodiment of the present invention;

FIG. 4 is a circuit diagram of the high-frequency section of an embodiment of the present invention;

FIG. 5 is a top view of the sealing insert between inductor sections of the present invention; and FIG. 6 is a top view of one of the heating inductors according to the present invention.

DESCRIPTION OF PREFERRED EMBODIMENTS

Figure 1:
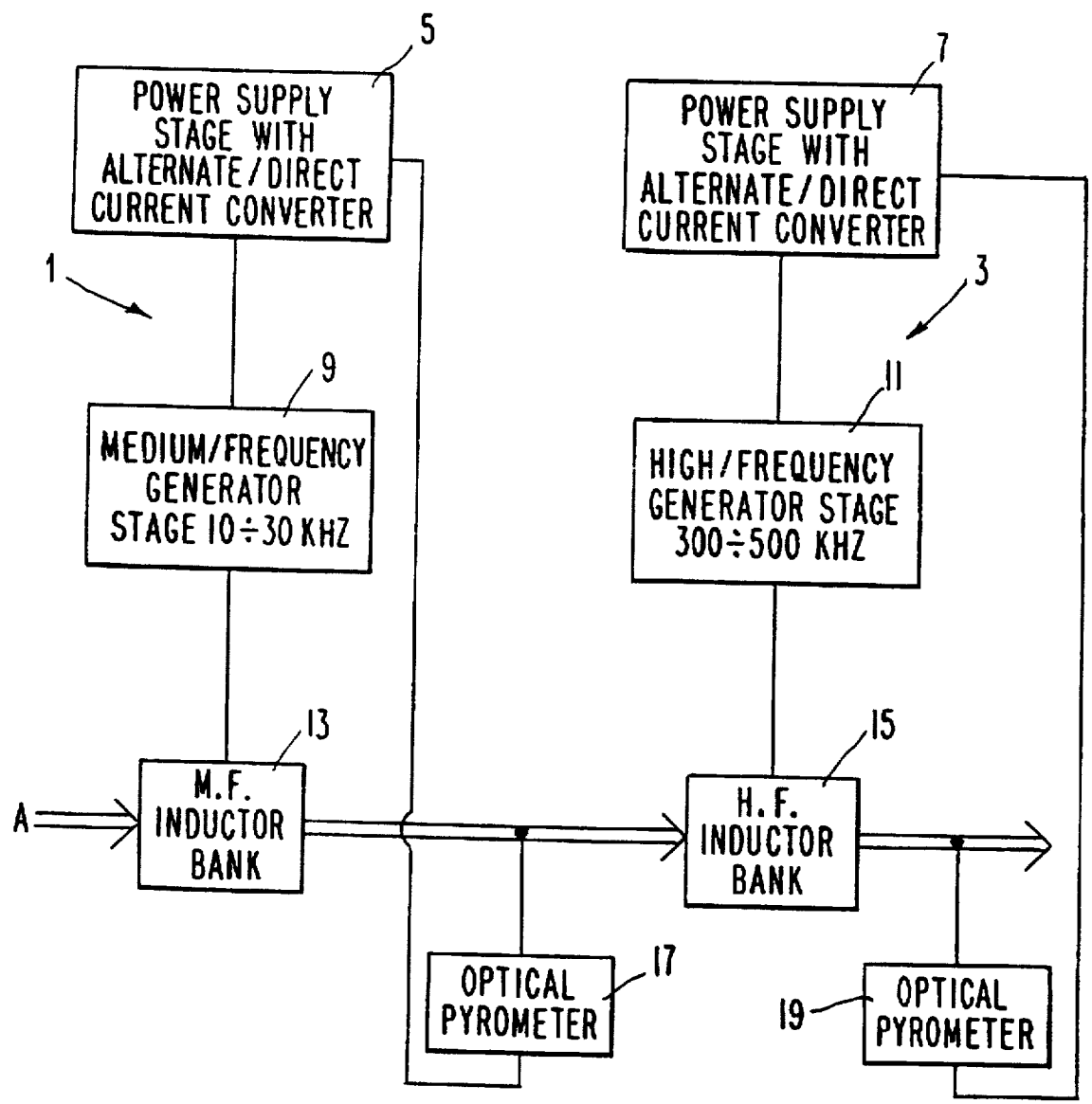
FIG. 1 is a block diagram of a first embodiment of the induction heating generator according to the present invention.

FIG. 1 shows a first embodiment of the induction generator of the present invention: in particular, there are shown here two induction generators with different frequencies for braze-welding double-walled metallic pipes with a continuous process, under a controlled atmosphere, especially for motor vehicle braking systems. These generators are composed of a medium-frequency section 1 and of a high-frequency section 3; these sections 1 and 3 respectively include a power supply stage 5 and another power supply stage 7 both containing thyristor converters for the linear adjustment with partialization of the braze-welding output power. The power supply stages 5 and 7 also include a Programmable Logic Controller (P.L.C.), that will be described in detail below, to handle interlaced systems that allow adjusting the load depending on its diameter variation without the need of replacing the inductors.

Connected in cascade with the power supply stages 5 and 7, there are two frequency generator stages 9 and 11, respectively: the stage 9 is with an inverter bridge, operating, in the described embodiment, at 10÷30 kHz to pre-heat the product with a continuous process, while the stage 11 is equipped with an electronic oscillator tube, operating, always in the described embodiment, at 300÷500 kHz to finally heat the product at the braze-welding temperature thereof.

Downstream of the stages 9 and 11 there are the inductor banks 13 and 15, including at least one heating inductor (in the described embodiment, the inductors are four per bank, and their number changes depending on the power output by generators and on the pipes to be produced). The bimetallic pipe produced moves on the line along the direction shown by arrow A and, after having passed the bank 13, is controlled by an optical pyrometer 17, equipped with optical fibers, whose purpose is monitoring process temperatures and feed-backing in a loop the automatic correction signals. The product then enters the bank 15 and is afterwards controlled by the optical pyrometer 19, quite similar to the pyrometer 17.

FIG. 2 shows a second embodiment of the induction generator of the present invention: in particular, there is shown here a high-frequency induction generator for annealing metallic pipes with a small diameter with a continuous process, under a controlled atmosphere, for refrigerating applications and the like. This generator is composed of a single high-frequency section 21 that includes a power supply stage 23 containing thyristor converters and a programmable controller, whose functions are the same as those previously described with reference to FIG. 1.

Connected in cascade with the power supply stage 23, there is the high-frequency generator stage 11, that is always with an electronic metallic-ceramic tube oscillator for industrial applications.

Downstream of the stage 11 there is the inductor bank 27, including at least one heating inductor (in the described embodiment there are two inductors). The produced pipe to be annealed moves on the line along the direction shown by arrow B and, after having passed the bank 27, is controlled by an optical pyrometer 29 quite similar to the previous pyrometers 17 and 19.

Both the embodiments shown in FIG. 1 and 2 provide, for the various inductor banks 13, 15 and 27, a single type of heating inductor with constant length and internal diameter for the whole range of pipes to be annealed and braze-welded, that, at the current state of the art and of the commercial standards, is included (but not limited to) between the 4.76-mm external diameter and the 10-mm one.

In the following the embodiment of the induction generator shown in FIG. 1 will be described in detail, omitting the one shown in FIG. 2, that is practically a sub-set of the previous embodiment, being wholly identical thereto in the part thereof related to the high-frequency section, that is the only one appearing therein. The embodiment in FIG. 2, in the end, uses the high-frequency generator (300÷500 kHz) only for annealing metallic pipes with a small diameter with a continuous process, under a controlled atmosphere, for refrigerating applications and the like.

The embodiment in FIG. 1, instead, uses, as a matter of fact, two induction generator in cascade: the first one has a frequency included, in the described embodiment, between 10 and 30 kHz, to pre-heat the material up to the Curie temperature thereof; the second one has a frequency that is preferably included between 300 and 500 kHz, to finally heat the material up to the braze-welding process temperature thereof equal to 1080°÷1100° C.

FIG. 3 shows the arrangement adopted for the first generator with a frequency between 10 and 30 kHz: therein, function of the unit L10 is filtering the residual ripple of the direct supply voltage, and this unit is preceded by a three-phase thyristor converter bridge (not shown, since it is well known) for rectifying network voltage with a linear control with partialization.

The circuit further includes an inverter bridge, with fast thyristors Th1÷Th4, or with transistors of the I.G.B.T. (Insulated Gate Bipolar Transistor) type to generate the medium-frequency voltage. There are also components RC3÷RC6, Z1÷Z4 to protect the thyristors Th1÷Th4, and a remote oscillating circuit 31, that is the characterizing part of this circuit, and is composed of the heating inductors 33 and of a capacitor bank Cmf.

The oscillating circuit 31 can be matched to the different load conditions by means of a variable-taps autotransformer AUTOmf, equipped with an electropneumatic switching device to suit the output voltage of the oscillating circuit 31 to varying load conditions. Matching to the load through the selection of the autotransformer AUTOmf tap is carried out by the programmable controller (P.L.C.) together with the capacity C11 change (FIG. 4) for the high-frequency generating section 11. In this way, that is through the programmable controller (not shown), interlacing is guaranteed between the two medium-frequency 9 and high-frequency 11 generators as regards their matching to varying load conditions or in order to compensate for the change in external product diameters. By means of this arrangement, it is possible to braze-weld the provided range of double-walled pipes with an external diameter variation from the current 4.76 mm to the current 10 mm, without the need of replacing heating inductors 33, both for the medium-frequency heating section, and for the high-frequency one.

These inductors 33, as better shown in FIG. 6, are each one composed of two half-inductors 33', 33", laid in series and in such a way that the winding direction of the first half-inductor 33' is opposite to the winding direction of the second half-inductor 33": this feature, that is the main one of the present invention, allows neutralizing the residual induced voltage in the pipe to be braze-welded. The presence of this residual voltage, as already seen, is the cause of product sparkings against mechanical guides and feeding rollers. Since there is provided a process that needs an hydrogen-based controlled atmosphere, the danger generated by these sparkings is immediately apparent, these sparkings producing gas ionization phenomena and ultimately explosion risks.

Thanks to the arrangement of the present invention, insulations between inductor and restraining pipe and between this latter one and the pipe to be braze-welded are minimally stressed from the dielectric point of view, guaranteeing a longer and safer working life.

Moreover, such arrangement allows adopting another improvement, that is a further characteristic of the present invention, that consists in confining the controlled atmosphere composed of the gas 35 only around the bimetallic pipe 37 to be braze-welded: this confinement is carried out through quartz tubes 39, that form the gas chamber 35 around the product 37, and are inserted inside the heating inductors 33 for the whole length thereof (FIG. 6), both in the medium-frequency section 1, and in the high-frequency one 3.

As further feature of the present invention, the heating inductors 33, that are no more immersed into the controlled atmosphere environment like in the prior art plants, are cooled by a forced water circulation and furthermore through a forced air circulation (that in the described, non limiting embodiment occurs along a vertical direction from the bottom upwards, as shown by arrow C in FIG. 6), which also performs a self-cleaning function as regards undesired metallic dust deposits present in the working environment. This external arrangement of the inductors 33 with respect to the controlled atmosphere area implies total safety against gas explosion risks, following possible electric discharges of the inductors 33 or between inductors 33 and produced pipe 37.

To be able to guarantee the controlled atmosphere seal between the different heating sections containing the inductors 33, a special arrangement has been adopted, that is a further feature of the present invention. As better shown in FIG. 5, this is composed of a gas-proof insert 41 with plane and parallel faces 43, 45, including a three-axial system composed of two metallic bellows 47 and 49 and of an internal driving through-bushing 51 made of through-holed ceramics and with a conical shape. The pipe 37 to be braze-welded passes through this bushing 51 that functions as centering member when passing from an inductor 33 to the following one.

Both the ceramic bushing 51, and the pipe 37 are immersed into the controlled atmosphere environment, and the confinement thereof, in this section of the plant, is carried out by the internal metallic bellows 49. Inside the chamber between internal bellows 49 and external bellows 47 the cooling water for the whole gas-proof insert 41 circulates in a loop, along the direction shown by arrow D in FIG. 5.

The hydraulic pressure of the cooling circuit generates an elastic elongation of the metallic bellows 47, 49, that is transformed into an elongation for the whole insert 41. This elongation under pressure guarantees a seal between the end faces 53, 54 of two contiguous inductors 33 wherein the insert 41 is housed with a simple sliding along the guides 55. In order to have access then inside the controlled atmosphere area for normal cleaning and routine maintenance operations, it is sufficient to stop the cooling water pump (not shown) for the plant. Through the following pressure drop of the hydraulic circuit, the insert 41 returns to its previous size (the hydraulic pressure being absent) and can therefore be removed, through a manual vertical sliding (with respect to the paper plane) from the seat thereof, thus freeing two contiguous sections 57 and 59 of the inductor bank 33, for example to replace the quartz tubes 39 in case of breakage or for their internal cleaning. With this arrangement, the common sealed, flanged junctions with screws and gaskets are avoided, that are typical in a tubular, gas-proof process pipe, highly reducing access times for maintenance interventions and making the related operations easier.

FIG. 4 shows the circuit arrangement adopted for the second, high-frequency generator (300+500 kHz) as regards the innovative part only, that is the oscillating stage 11. This high-frequency oscillating stage 11 is equipped with a metallicceramic triode V1 for industrial applications, used as Hartley oscillator with reverse grid feedback Ctg, realized through the LC network composed of L4 and the capacitor bank C11 of the high-frequency oscillating circuit. The output circuit of the oscillating stage 11 is provided with a high impedance, that is the inductive component of the high-frequency oscillating circuit is directly composed of the heating inductors 33 and therefore does not use transformers to match the output impedance.

From the triode V1, on the anode A, the inductor bank 33 is supplied through L5 (matching inductance for the output impedance) and a reverse feedback signal is provided taken from the point P in the network C11-L4 and sent, through Ctg and L3-R7 (that is a parasitic oscillation suppressor for the grid circuit) to the grid G of the triode V1. The other components in the oscillating stage are: T5, transformer turning on the triode V1 filament; R12-C12, parasitic oscillation suppressor between grid G and cathode K; L1, high-frequency locking inductance of the cathode circuit K; L2, high-frequency locking inductance of the grid circuit G; Ctk, transfer capacitor of the cathode K; C9, locking capacitor for radiofrequency returns towards grid biasing resistors R11; R11, grid G biasing resistor bank; Ag, amperometer for the grid current G; C4, locking capacitor against radiofrequency returns towards the d.c. power supply stage 7.

The innovative feature of the circuit arrangement adopted in FIG. 4 consists in having referred to ground the central tap P1 of the heating inductors 33, while, as regards the oscillating triode V1, none of the three electrodes thereof (cathode K, grid G and anode A) is directly referred to ground. That is, they are referred to the insulated negative pole N of the high supply voltage, apart from the anode A that is supplied by the positive grounded pole corresponding to the geometric center P1 of the heating inductors 33.

This arrangement is therefore different both from a classic circuitry with grounded cathode, and from an arrangement with grounded grid. Since the ground has been referred to the center P1 of the inductors 33, half of the supply voltage being present at the oscillating circuit ends is obtained at the inductor ends and to ground. This voltage value will be, however, the one useful for the type of application, that does provide an high-impedance output for the oscillating stage. This arrangement is usually realized with a "push-pull" circuitry, normally equipped with two electronic tubes. It then follows, due to the use of a single oscillating electronic tube, that there is a greater overall system efficiency, with following savings in terms of energy consumptions. Moreover, there is a higher intrinsic operating safety of the circuit, since it uses practically half the number of components used by a classic push-pull circuit equipped with two electronic tubes.

In this high-frequency circuit too, matching the generator to varying load conditions is obtained through an electropneumatic switching of the total number of capacitors C11 that compose the bank in the high-frequency oscillating generator circuit 11, this switching being handled by the programmable controlled (P.L.C.) in an interlaced way with the medium-frequency heating section 1.

As for the previous inductor bank 33 of the medium-frequency generator 1, in this case too the inductors 33 are divided into two half-inductors 33' and 33" and there are both the quartz tube 39, and the sealing inserts 41 described above.

I claim:

1. An apparatus for braze-welding a metallic pipe in a continuous process under a controlled atmosphere through inductively directly heating said pipe, comprising:

a) at least one heating inductor;

b) a generator for feeding said inductor;

c) means for maintaining said metallic pipe under a controlled atmosphere;

d) wherein said at least one inductor is comprised of two halfinductors in series, a winding direction of a first one of said two half inductors being opposite with respect to a winding direction of a second one of said two half inductors;

e) wherein said means for maintaining said metallic pipe under a controlled atmosphere comprises a quartz tube placed inside said inductor and containing a gas, with the pipe to be welded being advanced through said tube; and f) a sealing insert removably placed in a fitting point of two sections of said quartz tube corresponding to two contiguous inductors.

2. The apparatus according to claim 1 wherein said sealing insert comprises a pair of parallel plane surfaces containing therein a three-axial system with metallic bellows and a ceramic driving through-bushing in an internal and coaxial position with respect to said metallic bellows.

3. The apparatus according to any one of claims 1 or 2, wherein said at least one heating inductor does not contact said controlled atmosphere, the apparatus further including air circulating means, and wherein said at least one heating inductor is contacted with forced ambient air from said air circulating means.

4. The apparatus according to any one of claims 1 or 2, wherein said generator comprises two induction generators, a medium frequency generator having a medium frequency power supply and a high frequency generator having a high frequency power supply, to braze-weld double walled bimetallic pipes with a continuous process under a controlled atmosphere.

5. The apparatus of claim 4, wherein said apparatus comprises an apparatus for braze-welding double walled metallic pipes of a motor vehicle braking circuit.

6. The apparatus according to claim 4, wherein said medium frequency generator includes a medium frequency section and wherein said high frequency generator includes a high frequency section, each one of said sections being equipped with a load matching system suitable to compensate for external diameter variations in said metallic pipes without changing said at least one heating inductor.

7. The apparatus according to claim 6, wherein said load matching system comprises electropneumatic switches, said switches in said medium-frequency section switching taps on an autotransformer that supplies a first oscillating circuit and modifying a voltage in said first oscillating circuit, said switches in said high-frequency section switching a total number of capacitors in a bank of a second oscillating circuit and modifying a frequency of said second oscillating circuit.

8. The apparatus according to claim 6, wherein said high-frequency section is composed of an Hartley-type oscillating stage circuitry equipped with a single oscillating tube with a high-impedance output, said high-frequency section using as ground point a geometric center of said heating inductors without directly referring to ground any other point in said high-frequency oscillating stage, thereby halving a voltage between heating inductors and metallic pipes.

9. The apparatus of any one of claims 1 or 2, wherein said generator comprises a high frequency power supply for annealing metallic pipes having a small diameter in a continuous process under a controlled atmosphere.

10. The apparatus according to claim 9, wherein said generator includes a high-frequency section, said high-frequency section being equipped with a load matching system suitable to compensate for external diameter variations of said metallic pipes.

11. The apparatus according to claim 10, wherein said load matching system comprises electropneumatic switches, said switches switching a total number of capacitors in a flywheel bank of an oscillating circuit and modifying a frequency of said oscillating circuit.

12. The apparatus according to claim 10, wherein said high-frequency section is composed of an Hartley-type oscillating stage circuitry equipped with a single oscillating tube with a high-impedance output, said high-frequency section using as ground point a geometric center of said heating inductors without directly referring to ground any other point in said oscillating circuit.

13. The apparatus of claim 9, wherein said metallic pipes comprise pipes for use in refrigeration apparatus.

\* \* \* \* \*